United States Patent
Egbert et al.

(10) Patent No.: US 11,716,348 B2
(45) Date of Patent: Aug. 1, 2023

(54) MALICIOUS SCRIPT DETECTION

(71) Applicant: BluVector, Inc., Philadelphia, PA (US)

(72) Inventors: Stephen Egbert, Parkville, MD (US); Ryan Peters, Fairfax, VA (US); Scott Miserendino, Bethesda, MD (US)

(73) Assignee: BluVector, Inc., Philadelphia, PA (US)

( * ) Notice: Subject to any disclaimer, the term of this patent is extended or adjusted under 35 U.S.C. 154(b) by 661 days.

(21) Appl. No.: 16/176,206

(22) Filed: Oct. 31, 2018

(65) Prior Publication Data

US 2019/0132355 A1 May 2, 2019

Related U.S. Application Data (60) Provisional application No. 62/579,267, filed on Oct. 31, 2017.

(51) Int. Cl.
*H04L 9/40* (2022.01)
*G06F 21/56* (2013.01)

(52) U.S. Cl.
CPC ........ *H04L 63/1466* (2013.01); *G06F 21/566* (2013.01); *H04L 63/1416* (2013.01); *G06F 2221/2119* (2013.01)

(58) Field of Classification Search
CPC . H04L 63/1466; H04L 63/1416; H04L 67/02; H04L 63/1483; G06F 21/566; G06F 2221/2119
See application file for complete search history.

(56) References Cited

U.S. PATENT DOCUMENTS

| | | | | |
|---|---|---|---|---|
| 8,019,700 B2 * | 9/2011 | Provos | ............... | H04L 63/145 706/12 |
| 8,042,184 B1 * | 10/2011 | Batenin | ............... | G06F 21/566 726/24 |
| 8,201,245 B2 * | 6/2012 | Dewey | ............... | G06F 21/56 726/22 |
| 8,407,790 B2 * | 3/2013 | Mony | ............... | H04L 63/0281 726/22 |
| 8,607,349 B1 * | 12/2013 | Zaitsev | ............... | H04L 63/145 726/24 |
| 8,695,096 B1 * | 4/2014 | Zhang | ............... | G06F 21/564 726/24 |
| 8,789,178 B2 * | 7/2014 | Kejriwal | ............... | H04L 63/1416 726/22 |
| 8,838,992 B1 * | 9/2014 | Zhu | ............... | G06F 21/563 713/186 |

(Continued)

FOREIGN PATENT DOCUMENTS

| EP | 3002705 | | 4/2016 | |
|---|---|---|---|---|
| KR | 1858620 B1 * | | 1/2017 | ........... G06F 21/566 |

OTHER PUBLICATIONS

International Search Report and Written Opinion for Application No. PCT/US2018/058399, dated Jan. 23, 2019, 12 pages.

*Primary Examiner* — Oleg Korsak
(74) *Attorney, Agent, or Firm* — BakerHostetler (57) ABSTRACT

Systems and methods for detecting malicious or potenitally malicious script data are provided. Script data is extracted from a data stream at the network level and emulated in a controlled environment. Based upon a comparison of features extracted from emulation of the script to a set of heuristics, malicious script data can be identified for further analysis or processing.

25 Claims, 5 Drawing Sheets

(56) References Cited

U.S. PATENT DOCUMENTS

| | | | |
|---|---|---|---|
| 8,875,294 B2* | 10/2014 | Golavanov | G06F 21/565 726/24 |
| 8,997,233 B2* | 3/2015 | Green | G06F 21/566 726/24 |
| 9,032,516 B2* | 5/2015 | Kim | G06F 21/563 726/22 |
| 9,419,991 B2* | 8/2016 | Tyagi | G06F 8/427 |
| 9,501,643 B1* | 11/2016 | Zakorzhevsky | G06F 21/125 |
| 9,661,014 B2* | 5/2017 | Shafigullin | H04L 63/1466 |
| 9,680,848 B2* | 6/2017 | Kim | G06F 21/566 |
| 9,721,098 B2* | 8/2017 | Avrahami | G06F 21/563 |
| 10,033,747 B1* | 7/2018 | Paithane | G06F 21/554 |
| 10,069,852 B2* | 9/2018 | Turgeman | G01R 29/26 |
| 10,191,831 B2* | 1/2019 | Soeder | G06F 11/3466 |
| 10,230,745 B2* | 3/2019 | Singh | H04L 43/062 |
| 10,445,501 B2* | 10/2019 | Sejtko | G06F 21/562 |
| 10,579,796 B1* | 3/2020 | Neel | G06F 21/563 |
| 10,681,069 B2* | 6/2020 | Raz | H04L 63/1425 |
| 10,817,603 B2* | 10/2020 | Gaustad | G06F 21/562 |
| 2011/0041179 A1* | 2/2011 | St Hlberg | G06F 21/566 726/23 |
| 2011/0083183 A1* | 4/2011 | Freeman | G06F 21/566 726/24 |
| 2011/0197272 A1 | 8/2011 | Mony | |
| 2011/0307955 A1 | 12/2011 | Kaplan | |
| 2012/0159629 A1* | 6/2012 | Lee | H04L 63/1416 726/24 |
| 2012/0216280 A1* | 8/2012 | Zorn | G06N 7/005 726/23 |
| 2015/0150130 A1* | 5/2015 | Fiala | G06F 21/56 726/23 |
| 2015/0169874 A1* | 6/2015 | Cui | G06F 21/566 726/24 |
| 2016/0065613 A1* | 3/2016 | Cho | H04L 63/1416 726/23 |
| 2018/0103043 A1* | 4/2018 | Kupreev | H04L 63/1483 |

* cited by examiner

MALICIOUS SCRIPT DETECTION

CROSS-REFERENCE TO RELATED APPLICATIONS

This application claims priority to U.S. Provisional Patent Application No. 62/579,267, filed Oct. 31, 2017, the disclosure of which is incorporated by reference in its entirety.

BACKGROUND

Computer systems are threatened by the covert insertion of malicious logic. A significant amount of malicious activity, external and internal to an enterprise, occurs with common user actions, such as user visits to a website or the use of software that appears to be legitimate. In other scenarios, social engineering can be used to trick users into visiting malicious websites, and/or opening malicious PDFs, text files or other documents delivered via email. Once the threat actor is able to get initial code execution on a machine it is up to the host system's access controls to prevent compromise.

One of the most popular ways to execute malicious logic that is transparent to an end user is through JavaScript. JavaScript is one of the core technologies of World Wide Web content production. It is used to make webpages interactive and provide online programs, including video games. The majority of websites employ it, and modern web browsers support it without the need for plug-ins. Malicious actors leverage the broad adoption of JavaScript to spread their attacks. In many attacks, threat actors utilize JavaScript to orchestrate the download and delivery of exploits and malware that allow them to take control of a victim's machine.

Methods currently exist for the detection of malicious logic. The current diagnostic methods, however, are not always reliable and can be slow to detect an attack. Due to the extremely large volume of JavaScript present in modern WWW traffic, slow detection techniques often cannot meet the demand to analyze all potentially threatening websites. Moreover, some of these methods can only operate in an off-line mode and are unable to provide timely protection. Furthermore, existing techniques typically require software to be run on a host system along with the web browser that receives the potentially malicious content. Some hosts that contain web browsers may not allow the installation of protective measures such as medical devices, military systems, industrial control systems, user-provided mobile device and small-devices comprising the Internet of Things (IoT). Protecting such devices is often performed at the network-level by monitoring all traffic to and from them.

DETAILED DESCRIPTION

The systems and methods described herein provide for real-time or near real-time detection of malicious logic at the network-level. Scripts are isolated and distilled into bytecode form, then executed in a relatively lightweight emulation setting. Execution results are collected and analyzed to identify potentially malicious or otherwise undesirable behavior.

Notably, a system as disclosed herein may operate on network packets that have not yet reached a final destination such as an end-user server, desktop or other workstation, mobile device, or the like. In some arrangements, a system as shown and disclosed herein may operate outside a protected area of a network such as at a "border" interface of a private network or other network to the Internet or other large-scale network.

Systems and techniques disclosed herein may be considered to operate at "network speed" or a "network rate" because they may evaluate potentially-malicious data as the data is transported to or through a network, without incurring significant or any delay in transmission rate. That is, data being analyzed may not be significantly or measurably slowed due to the embodiments disclosed herein. As a specific example, an analysis of a specific script may be completed in less than a few milliseconds or, more preferably, less than 1 millisecond. Similarly, embodiments disclosed herein may be referred to as "file-less" analysis because they do not require potentially-malicious scripts to be written to disk or other long-term memory prior to or during the analysis techniques disclosed herein.

Figure 1A:
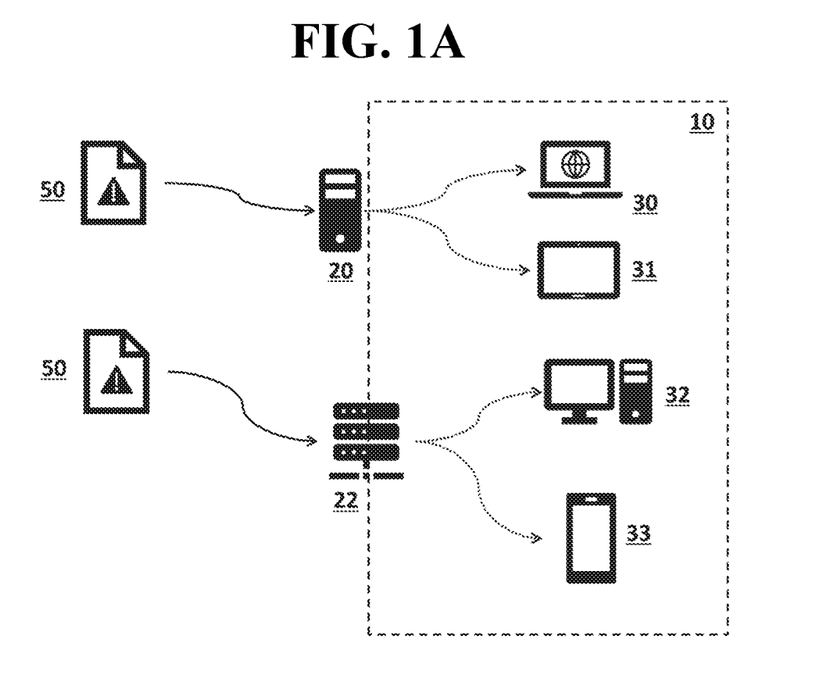
FIG. 1A shows a schematic representation of an example system in which malicious script detection as disclosed herein may be performed.

FIG. 1A shows an example system in which embodiments disclosed herein may be used. A computer network 10, which may be a corporate, local area, personal, virtual private, or any other computer network, may include one or more end user device 30, 31, 32, 33, such as workstations, mobile devices, tablets, smart appliances, or the like. The network may be subject to attack or potential attack by malware such as malicious scripts 50 or similar content. Malicious content may be included in the scripts 50 directly, such as where they are executed on an end user device 30 and cause harm to the device 30 or other devices 31, 32, 33 in the network, the network 10 itself, or to other devices, such as where the device 30 is compromised and used as an attack vector for other networks or devices outside of network 10. Alternatively or in addition, the scripts may cause the end user device on which they are executed to otherwise obtain the malicious content, such as where a script 50 causes an end user device 30 on which it is executed to download malicious content from a remote site for execution on the end user device 30.

As the potentially malicious content 50 is transmitted to the network 10, it may be received or intercepted by one or more computerized devices 20, 22, which may be outside of or at a border interface of network 10 to a larger network such as the Internet as previously disclosed. The devices 20, 22 may be any suitable devices such as generic servers, intrusion detection systems, routers or similar devices, network analysis systems, or the like. In the absence of embodiments disclosed herein, the content 50 would be transmitted to one or more user devices 30, 31, 32, 33, where it may be executed and thereby implement the malicious behavior. However, embodiments disclosed herein may identify the malicious content 50 as it enters the network and thereby prevent it from reaching the user devices entirely. Notably, embodiments disclosed herein may operate on a generic stream of data entering the network at "line" or "network" speeds. That is, the devices 20, 22 implementing the techniques disclosed herein need not be capable of identifying the data in the potentially malicious content 50 as any particular data, or of processing it other than as disclosed herein.

Figure 1B:
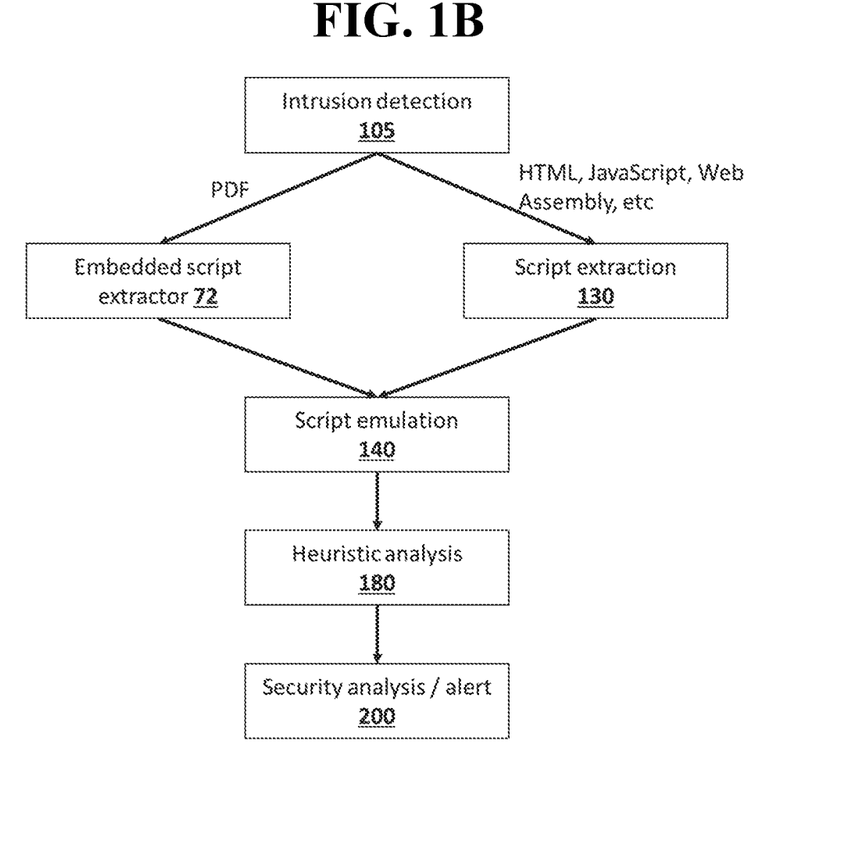
FIG. 1B shows a schematic representation of an example malicious script detection system according to an embodiment disclosed herein.

FIG. 1B shows a simplified schematic representation of a system and workflow as disclosed herein. An intrusion detection system 105, which may include a protocol analyzer as disclosed in further detail herein, may receive an initial data stream entering a network such as the network 10 described with respect to FIG. 1A. The detection system 105 may be implemented by and/or on one or more computerized devices such as devices 20, 22 in FIG. 1A. For data streams that can be processed directly such as HTML, JavaScript, Web Assembly, and the like, script data may be passed to a script extraction module 130, such as a correlation daemon as disclosed herein. For example, HTML, JavaScript, and WebAssembly code may be placed into a queue such as a Redis database with a predefined aging threshold. Periodically the extraction module 130 may attempt to build an analytics package by resolving references within the data, such as among HTML and JavaScript and/or JavaScript and WebAssembly. Once all references are resolved, the script data may be provided to an emulation module 140. If the aging threshold is reached and a portion of script data such as a JavaScript or WebAssembly file has not been used in an analytics package or there are outstanding unresolved references in the available script data, the available standalone script data may be provided to the emulation module 140 for isolated analysis. Other data, such as PDF file data that may include embedded JavaScript or similar script data, may be processed by an embedded script extractor 72 to extract the script data.

In either case, a script emulation module 140 such as a script emulator as disclosed herein may emulate execution of the script data received from the extractor 72 and/or the extraction module 130. For example, all identified script segments, such as all JavaScript segments, may be stitched together into a single JavaScript component that is analyzed by the emulation module 140. The combined JavaScript or other script segment may be prepended with generic script code that mocks the Document Object Model (DOM) and common JavaScript functions. The emulation may be performed over the JavaScript segment. Any WebAssembly or similar code may be loaded into the emulation module as well, so that it can be referenced by the JavaScript. A heuristics analysis module 180, such as an analyzer as disclosed herein, may compare results of the script emulation to one or more heuristics. Script data that meets one or more heuristics may be identified as malicious, potentially malicious, or otherwise potentially harmful by a security analysis module 200. In some cases, identified script data may be identified to a security analyst or other entity for further analysis and/or action, such as where a security analyst is provided with an interface to examine potentially-malicious script data. As another example, a security analysis module may take further action with respect to the script data and/or the data stream from which it was obtained.

Figure 2:
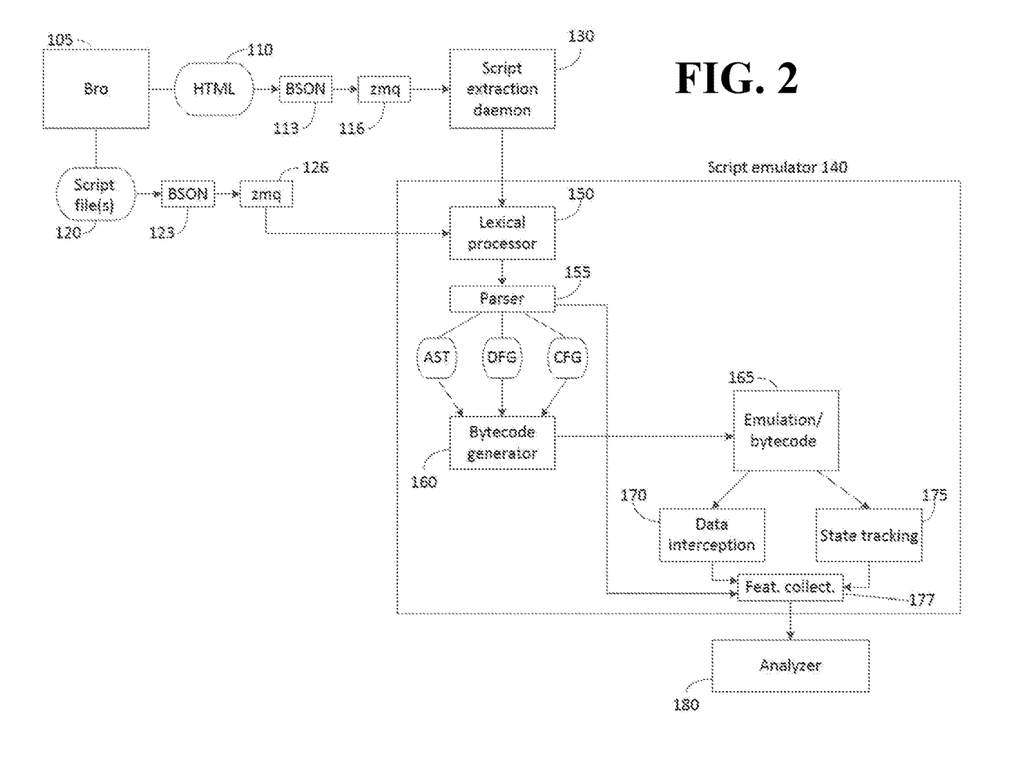
FIG. 2 shows a schematic representation of an example malicious script detection system according to an embodiment disclosed herein.

A detailed example of a system according to embodiments disclosed herein is illustrated in FIG. 2. Messages may be received and processed by a protocol analyzer 105. The analyzer may be a network security monitor or intrusion detection system (IDS), such as the open-source Bro system available from www.bro.org, or any similar or comparable protocol analyzer or analysis system. In general, the protocol analyzer 105 is responsible for reconstructing network streams from their constituent packets as they enter a network of interest in order to extract information such as HTML and script data such as Javascript. The protocol analyzer 105 may be integral with, or a separate system from the other components shown and described herein.

The protocol analyzer 105 may generate HTML 110 and package it for additional analysis, for example as a binary JSON (BSON) object 113. More generally, the protocol analyzer 105 may provide a serialized or otherwise processable version of scripts or similar material identified in network traffic being received by a system being monitored by the system disclosed herein.

The BSON object(s) may be passed to a correlation daemon ("HTML_JS_Extractor") 130 via a pull operation from a zero message queue (zmq) module 116. The correlation daemon 130 may receive, for example, initial HTML, JavaScript, and/or WebAssembly content. The correlation daemon 130 may extract any JavaScript or other scripting data found therein from the initial HTML content. The correlation daemon 130 also may note HTML tag, attributes and/or values used associated with each JavaScript☐class tag or equivalent in other scripting languages. This may include, but is not limited to the "javascript" and "script" HTML tags, and may include, but is not limited to, the "src," "type," and "a=" HTML attributes, including all HTML values found associated with tag and/or attribute. Alternatively or in addition to processing HTML and JavaScript or equivalent data separately, a correlated package may be provided to a script emulator, such as in a configuration as shown in FIG. 1B.

Any script data extracted by the daemon 130 may be passed from the daemon 130 to a lexical processor 150 operated in or by a script emulator 140 (e.g., "JS_Emulator"). The script emulator may be, for example, a controlled execution environment that allows a script or various portions of a script to be executed to determine the likely effect of the script execution in the emulator 140, and thus determine how the script would operate in an endpoint system. For example, a script may be extracted from data that would have been delivered to an end user device such as a computer or mobile device as previously disclosed. When the extracted script is executed by the script emulator 140, it may be determined that the script would have a particular known effect on the end user device if delivered to and executed on the device, such as redirecting the user's browser to a different website, causing the device to download malicious software ("malware"), connecting the end user device to a specific remote computer, or the like. This determination may be made by the analyzer 180 (e.g, "JS_Heuristics"). For example, the analyzer 180 may use predefined heuristics to identify conditions that represent real or potential compromises. Alternatively or in addition, the analyzer 180 may use a trained model to identify such conditions. Such a model may be created using maching learning methods, such as support vector machines, bayesian belief networks, neural networks or decision trees, which have previously been trained using a body of training data. The machine learning-based model, known as a classifier, may then operate on data obtained from the secript emulator 140 to identify security-related conditions.

In addition or in the alternative, the analyzer module 105 may output one or more script files 120 directly. These files may be similarly processed as BSON objects 123 and may be sent to a zmq module 126 or otherwise processed and provided to the script emulator 140 as previously disclosed.

That is, the analyzer may directly provide the script data that is processed by the script emulator 140.

Referring again to FIG. 2, an example logical structure and arrangement of a script emulator 140 as disclosed herein is shown. The script emulator 140 may include a lexical processor 150 that may remove, re-order and/or tokenize data based on a defined grammar from the received scripts. For example, the script data received from the daemon 130 or the analyzer module 105 may be rewritten into a consistent format for processing by a parser 155.

The output of the lexical processor 150 may be sent to a parser 155, which may output, for example, an abstract syntax tree (AST), a data flow graph (DFG), and/or a control flow graph (CFG). These may be passed to a bytecode generator 160, which produces executable code. As a specific example, the processing performed by the analyzer 105, script extraction daemon 130, lexical processor 150, and parser 155 may generate executable code from obfuscated JavaScript. The executable code may be an equivalent to the JavaScript that would have been executed on an end point device if the code had not been intercepted prior to being transmitted to the device. For example, where the data stream received by the analyzer 105 includes obfuscated malicious JavaScript, the executable code produced by the bytecode generator may be functionally equivalent to the malicious software that would have been executed within a browser at the end point device.

The executable code may be sent to an emulation module 165 (e.g., "JS_Interpreter"). At the emulation module 165, the code is executed in a limited functionality environment. In an embodiment where the scripts are implemented in JavaScript, the emulation module 165 may be or may include a JavaScript engine. For example, in a conventional execution environment, code would be run in the context of a browser (containing a JavaScript execution engine) and a host operating system. However, emulation module 165 provides an execution environment that includes only those components of the relevant script execution engine that are strictly needed for execution and analysis of the script. For example, if a particular script does not include any commands to access a particular portion of computer storage that would be expected on the conventional browser execution environment the emulation module 165 may not provide any functionality related to accessing an emulated version of that storage. In general, the limited-functionality environment may allow for faster operation than would be possible in a conventional sandbox-style test environment, so that the emulation can take place at speeds equal to, or that approach network rates.

The execution performed at 165 may be speculative or exhaustive. In the former case, branching may be performed so that execution paths within the script being analyzed are chosen on the basis of potential security concerns, e.g., whether the browser or operating system are affected or if the path involves branching logic based on environmental variables (e.g. operating system present, browser used, available versions of browser plug-ins). Additionally, if portions of the script attempt to access methods that are unavailable, the unavailable method calls may be mocked to allow for continued execution. Such an execution technique may also allow for relatively fast execution by executing only a subset of execution paths that are available in the script as a whole. In exhaustive execution, all execution paths may be executed. Speculative execution also may allow for rapid determination of the capacity for malicious behavior without requiring complete and faithful execution of the entire content of a potentially-malicious script. As a specific example, a script may check for the presence of a particular browser extension, feature, or other component. Speculative execution can force both "true" and "false" cases where the component is and is not present as separate traces. Such operation violates a "faithful" execution of the script which, in a real non-emulated environment could only ever reach one of the two cases. This is useful in detecting malicious or potentially malicious behavior, since malicious behavior may only be exhibited in one of the two cases.

More generally, the technique of speculative execution as disclosed herein may determine what an input can do rather than what it does do upon execution. In a conventional sandbox, a file under analysis will act only one way based on the execution environment and the automated (emulated) "user" activity present. This conventional approach presents several problems. First, an enterprise may have many end-point environments, so that a file that is benign in one may be malicious in another. Performing sandboxed execution for all or even most of the possible environments may be cost prohibitive, or technically infeasible or impossible. Second, modern malware often contains sandbox evasion technology that attempts to fool a conventional sandbox into determining that the software is benign, i.e., does not contain any malicious code. Such evasion protocols require the malware to be executed as designed. Speculative execution as disclosed herein may avoid some or all of these problems by determining the potential capacity for malicious behavior in a script, rather than only the specific actions that occur upon execution of the script. For example, as previously disclosed, speculative execution may allow for multiple execution paths as separate traces, which would not be considered or available for a single script operating in a regular environment.

The results of the script emulation performed by the emulation module 165 may be provided to one or more modules for collection and analysis. For example, a data interception module 170 may receive data that would be generated by the script being analyzed if it was executed on the intended browser platform. Alternatively or in addition, a state tracking module 175 may identify states of the emulation module 165 that correspond to states into which the browser or other intended host platform would be placed due to execution of the script. For example, the state tracking module 175 may record each state into which a conventional browser would be placed upon execution of the script being executed by the emulation module 165, such as to allow identification of states that may cause the browser to be vulnerable to a particular type of exploit.

Data obtained by the data interception module 170 and state tracking module 175 may be provided to a feature collection module 177. This module may analyze the received data to identify known features or types of features for further processing by the analyzer 180 as previously disclosed, such as by applying heuristics to the features to determine whether execution of the script results in malicious or other undesirable effects on a host system.

Figure 3:
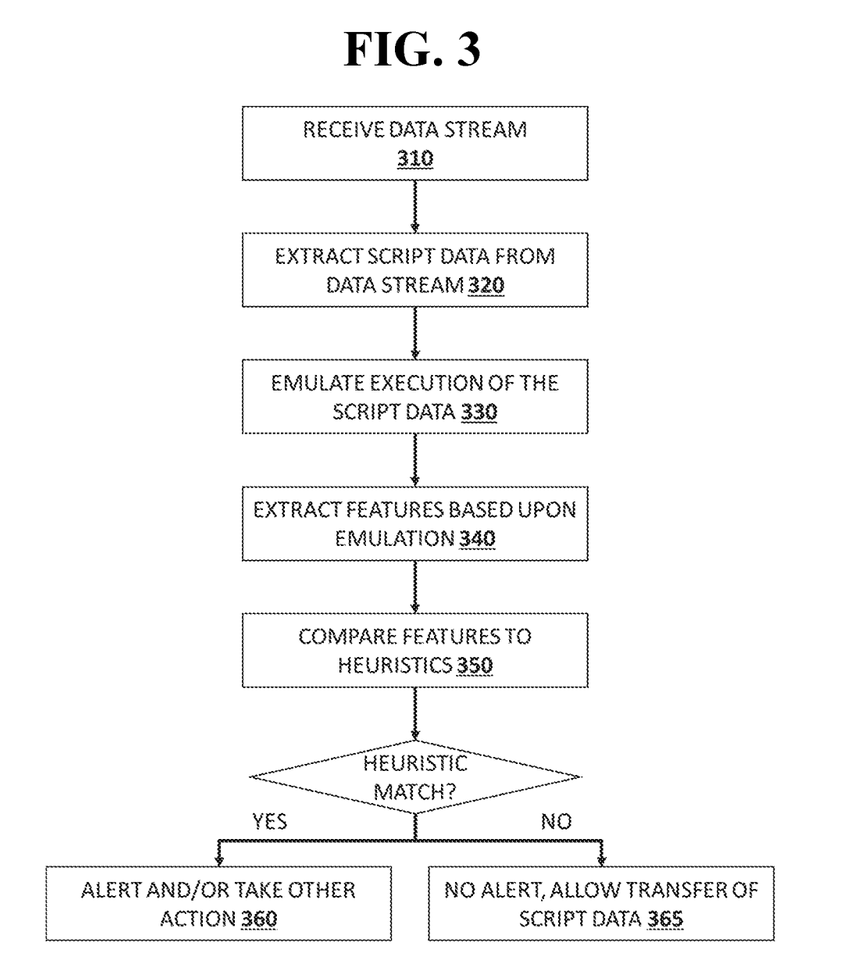
FIG. 3 shows an example process for detecting malicious script data as disclosed herein.

FIG. 3 shows an example process for identifying potentially-malicious data according to an embodiment disclosed herein. At 310, a data stream to be analyzed may be received. For example, a data stream containing one or more scripts may be received by an analyzer 105 as previously disclosed. Script data may be extracted at 320. The script data may include one or more obfuscated or un-obfuscated scripts as described herein, such as JavaScript scripts, action scripts, PowerShell or the like.

At 330, execution of the script data may be emulated, such as by the script emulator 140 as previously disclosed. In some embodiments, the script data may be suitable for immediate emulation such as by an emulation module 165, or the script data may be processed by a lexical processor 150, bytecode generator 160, or similar modules as described with respect to FIG. 2. At 340, features resulting from emulation of the script may be collected. For example, the number of variable updates may be counted, the string entropy of various strings within or generated by the script may be calculated, or the like. Any extracted features may be compared to one or more heuristics as disclosed herein at 350 to determine whether the script contains, or is likely to contain, malicious software. If the features are a sufficient match to the heuristics, at 360 further action may be taken. For example, an alert may be raised or a security analyst or analysis platform may be notified of the presence of malicious or potentially-malicious script data in the data stream. Alternatively or in addition, the data stream or a portion of the data stream containing the script data may be prohibited from being further transmitted. The features may be considered to have a "sufficient" match to the heuristics if it matches a threshold number of individual heuristics, if a total score calculated for the script as disclosed herein is reached, or if the script has a sufficiently strong match or score for a threshold number of individual heuristics. In some embodiments, a single match to a single heuristic may be sufficient for the script to be considered a match. If no match is found or if the script is less than a "sufficient" match, it may be allowed to be transferred into or within the network and may not be brought to the attention of security analysts. For example, data that contains no malicious script data or that is believed to contain no malicious script data may be transmitted by a system as disclosed herein as normal, i.e., as would happen in the absence of the systems and techniques disclosed herein.

Figure 4:
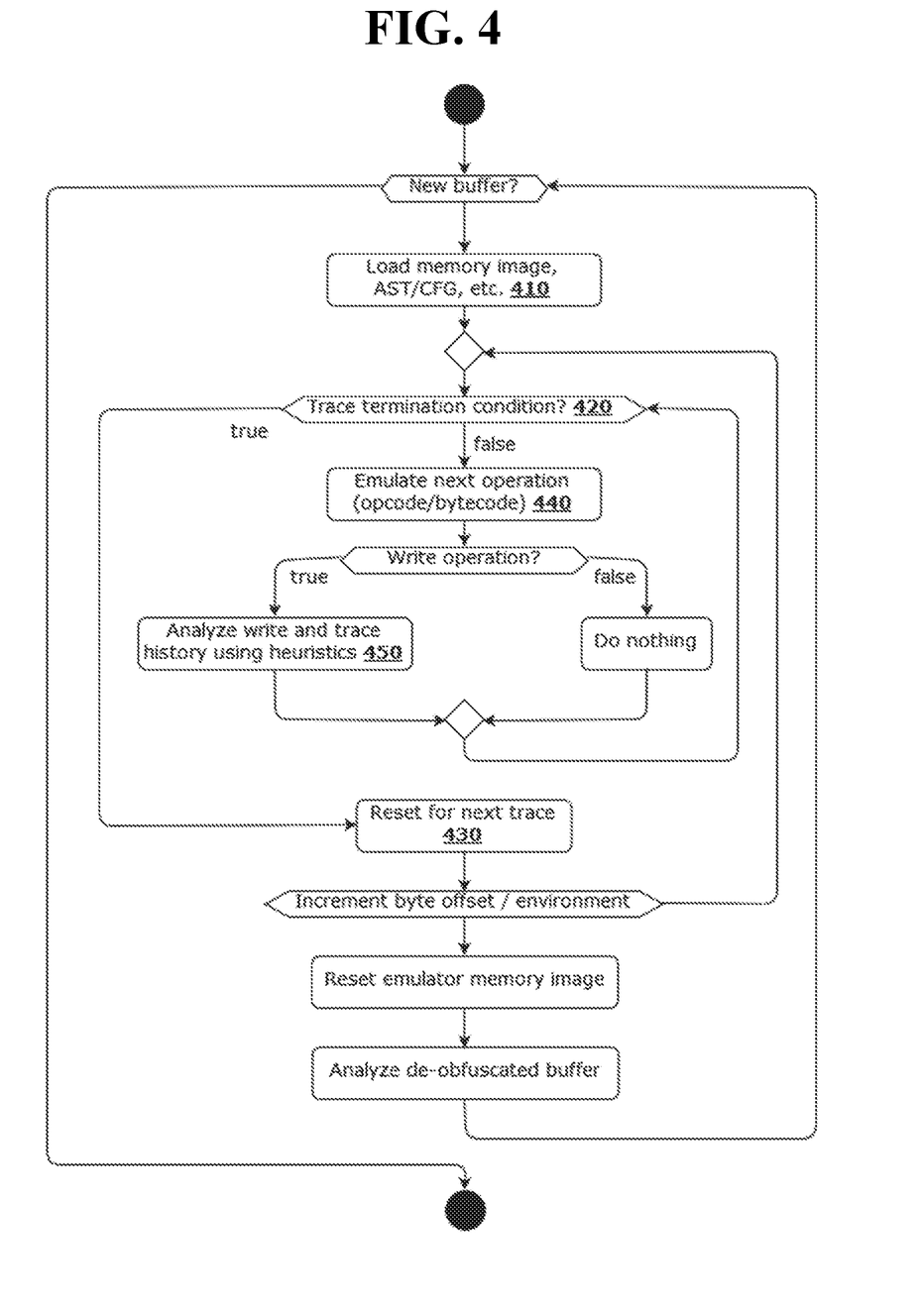
FIG. 4 shows an example process for speculative execution of a script as disclosed herein.

FIG. 4 shows an example process for speculative execution of a script as disclosed herein, such as by an emulation module 165 as previously disclosed. At 410, a memory image, AST/CFG as previously disclosed, or other representation of a script may be accessed, such as by loading into a short-term memory. At 420, the system may determine whether a termination condition, such as an execution endpoint has been reached. If so, the system may reset for the next trace at 430; otherwise at 440 the next operation, bytecode, or other execution component may be emulated. If a write operation or other operation of interest results, at 450 the results of the operation and the history of the execution path may be analyzed using heuristics as disclosed herein; otherwise the process may return to 420. The process may be completed for each buffer, such as for each script file(s) obtained by an analyzer 105 and/or a script extraction daemon 130 as previously disclosed. Each trace may be analyzed using a set of heuristics as disclosed herein to determine whether it is, or may be, malicious. The analyzed trace may include the set of all executed manipulations that are encountered through the execution path resulting during speculative execution of the script. Notably, a process such as the process shown in FIG. 4 may rapidly determine whether a script or set of scripts is capable of producing malicious behavior without regard to whether or not any particular execution path or execution endpoint actually does produce a specific malicious result.

As previously disclosed, a set of heuristics may be used to determine the likelihood that a particular script, set of scripts, execution path, or other data obtained from the network may be malicious or otherwise harmful. The heuristics may be predetermined and static, i.e., they may be defined once within a system as disclosed herein and applied consistently to all data analyzed by the system. Alternatively or in addition, heuristics may be adjusted over time automatically or by one or more users. For example, a machine learning system may be trained to adjust heuristics based on prior performance. As another example, users may be provided with an interface to adjust heuristics such as by adjusting one or more threshold values employed by the heuristics.

Examples of heuristics that may be applied include the following:

String entropy: This is a measure of the number of strings found within the script data that have a suspicious entropy, such as below or above particular threshold. As a specific example, string entropy less than 0.3 or greater than 5.1 may be considered suspicious. As is known in the art, the "entropy" of a string gives a measure of the predictability or randomness of a string. Where a string has a particularly high or low entropy, this may be an indication that the string represents obfuscated data or other potentially-malicious content. The entropy of a string may be calculated using any technique for determining string or other data entropy known in the art.

Bad script practices: This heuristic measures the number of bad practices detected in the script. It has been found that malicious scripts often use known bad practices in the art more frequently than non-malicious scripts, which typically seek to avoid known bad practices.

Obfuscated variable names, protocols, bad practices, sensitive keywords, or reserved words: These heuristics count the number of each obfuscated item found in the script data. It has been found that malicious scripts often attempt to obfuscate these items to avoid detection by conventional end-user detection systems. For example, HTTP, FTP, and other protocols may be obfuscated to hide communications intended to be sent or received by the script, files intended to be downloaded to the end user computer by the script, or remote sites the script will attempt to access from the end user device when executed by the end user devce. Similarly, reserved words or keywords for a particular scripting language may be obfuscated in an attempt to hide specific functionality implemented by the script. As another example, bad practices may be obfuscated in order to hide detection where it is known in the art that such practices may be commonly used in malicious executable code.

Excessive variable updates: It has been found that malicious scripts often perform far more variable updates than non-malicious software. Accordingly, this heuristic may measure the number of variable updates, or may indicate whether an excessive number of variable updates occurs, such as by determining whether the number of variable updates exceeds a threshold. As a specific example, 200 or more variable upates within a script, or to a specific variable, may be considered excessive.

Heuristics may be applied sequentially, concurrently, or in any suitable combination. They may be used to calculate a score for each evaluated script or other data, for example, by assigning a "1" to each heuristic met by the script and a "0" to each heuristic not met, or by any other suitable and/or known technique for applying heuristic measurements. Heuristics may be weighted, such as where one or more heuristics are found to provide greater predictive power regarding the likelihood that a script is malicious. In such a configuration, each heuristic may be assigned a weight that is multiplied or otherwise used to modify the initial score for the heuristic.

In some cases, a script may be identified as malicious if it meets any of a set or subset of heuristics. For example, it may be desirable to identify any script that has any occurrence of obfuscated URL protocols as a malicious script, since typically there is no reason to perform such obfuscation in non-malicious scripts or other executable code. Other heuristics that may result in a script being identified as malicious may include identification of bad practices, excessive variable updates, obfuscated bad practices or sensitive keywords, or the like. More generally, any heuristic or set of heuristics may be used to identify a script as a malicious script upon any occurrence of the heuristic in the script.

As used herein, a "script" or "script data" refers to any executable data that is written in a scripting language such as JavaScript, Action Script, PowerShell, shellcode, or the like. A script may be stored and/or transmitted in a network in plain text or bytecode, either of which may be obfuscated or not obfuscated. Script data also may be embedded within other file types, such as PDF, proprietary formats such as Microsoft Office, XML files, compressed archives, and the like.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description and the enclosed attachments, for purpose of explanation, have been described with reference to specific embodiments. However, these illustrative discussions are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A method comprising:
   receiving, via a network, data comprising one or more scripts, wherein the data is intended for a user device;
   determining, based on execution of at least a portion of the one or more scripts, one or more features associated with the one or more scripts;
   determining, based on the one or more features, that the one or more scripts are associated with one or more malicious behaviors; and
   sending, based on the one or more malicious behaviors and to the user device, a message indicating that the data is associated with the one or more malicious behaviors.

2. The method of claim 1, wherein the portion is associated with one or more security conditions comprising at least one of: redirecting a browser of the user device, or access to an operating system of the user device.

3. The method of claim 1, wherein the portion comprises one or more combined segments of the one or more scripts.

4. The method of claim 1, wherein execution of the portion provides an indication of a same function as execution of the one or more scripts by the user device.

5. The method of claim 1, wherein the one or more malicious behaviors indicate one or more effects of the user device executing the one or more scripts.

6. The method of claim 1, wherein the one or more malicious behaviors comprise at least one of: redirecting a browser of the user device to a website, causing the user device to download malicious software, or causing the user device to communicate with a computing device.

7. The method of claim 1, wherein the determining, that the one or more scripts are associated with the one or more malicious behaviors, is further based on a machine learning model.

8. The method of claim 7, wherein the machine learning model is based on at least one of: a support vector machine, a Bayesian belief network, a neural network, or a decision tree.

9. The method of claim 1, further comprising:
   generating, based on removal of format inconsistencies or obfuscated code from the one or more scripts, the portion.

10. The method of claim 1, wherein the one or more features comprise at least one of: an obfuscated variable name, a number of updates to a variable name exceeding a first threshold, an obfuscated Uniform Resource Locator (URL) protocol, an obfuscated scripting language keyword, an obfuscated scripting language reserved word, or entropy of a string exceeding a second threshold.

11. The method of claim 1, wherein the execution comprises executing one or more branches associated with the portion to cause evaluation of the portion to true and false cases.

12. The method of claim 1, wherein the one or more scripts comprise executable data that is written in a scripting language.

13. A device comprising:
   one or more processors; and
   memory storing instructions that, when executed by the one or more processors, cause the device to:
      receive, via a network, data comprising one or more scripts, wherein the data is intended for a user device;
      determine, based on execution of at least a portion of the one or more scripts, one or more features associated with the one or more scripts;
      determine, based on the one or more features, that the one or more scripts are associated with one or more malicious behaviors; and
      send, based on the one or more malicious behaviors and to the user device, a message indicating that the data is associated with the one or more malicious behaviors.

14. The device of claim 13, wherein the portion is associated with one or more security conditions comprising at least one of: redirecting a browser of the user device, or access to an operating system of the user device.

15. The device of claim 13, wherein the one or more malicious behaviors indicate one or more effects of the user device executing the one or more scripts.

16. The device of claim 13, wherein the one or more malicious behaviors comprise at least one of: redirecting a browser of the user device to a website, causing the user device to download malicious software, or causing the user device to communicate with a computing device.

17. The device of claim 13, wherein the instructions, when executed by the one or more processors, further cause the device to:
generate, based on removal of format inconsistencies or obfuscated code from the one or more scripts, the portion.

18. The device of claim 13, wherein the one or more features comprise at least one of: an obfuscated variable name, a number of updates to a variable name exceeding a first threshold, an obfuscated Uniform Resource Locator (URL) protocol, an obfuscated scripting language keyword, an obfuscated scripting language reserved word, or entropy of a string exceeding a second threshold.

19. The device of claim 13, wherein the execution comprises executing one or more branches associated with the portion to cause evaluation of the portion to true and false cases.

20. A non-transitory computer-readable medium storing instructions that, when executed, cause:
receiving, via a network, data comprising one or more scripts, wherein the data is intended for a user device;
determining, based on execution of at least a portion of the one or more scripts, one or more features associated with the one or more scripts;
determining, based on the one or more features, that the one or more scripts are associated with one or more malicious behaviors; and
sending, based on the one or more malicious behaviors and to the user device, a message indicating that the data is associated with the one or more malicious behaviors.

21. The non-transitory computer-readable medium of claim 20, wherein the portion is associated with one or more security conditions comprising at least one of: redirecting a browser of the user device, or access to an operating system of the user device.

22. The non-transitory computer-readable medium of claim 20, wherein the one or more malicious behaviors indicate one or more effects of the user device executing the one or more scripts.

23. The non-transitory computer-readable medium of claim 20, wherein the one or more malicious behaviors comprise at least one of: redirecting a browser of the user device to a website, causing the user device to download malicious software, or causing the user device to communicate with a computing device.

24. The non-transitory computer-readable medium of claim 20, wherein the one or more features comprise at least one of: an obfuscated variable name, a number of updates to a variable name exceeding a first threshold, an obfuscated Uniform Resource Locator (URL) protocol, an obfuscated scripting language keyword, an obfuscated scripting language reserved word, or entropy of a string exceeding a second threshold.

25. The non-transitory computer-readable medium of claim 20, wherein the execution comprises executing one or more branches associated with the portion to cause evaluation of the portion to true and false cases.

* * * * *